United States Patent [19]

Ernst et al.

[11] Patent Number: 4,682,719
[45] Date of Patent: Jul. 28, 1987

[54] VEHICLE TOP CARRIER

[75] Inventors: M. Eric Ernst, Grosse Pointe Park; Walter L. Jewett, Huntingtonwoods, both of Mich.

[73] Assignee: Pivot Manufacturing Company, Detroit, Mich.

[21] Appl. No.: 574,892

[22] Filed: Jan. 30, 1984

[51] Int. Cl.⁴ .................................................. B60R 9/00
[52] U.S. Cl. ..................................... 224/310; 224/321
[58] Field of Search .............. 414/462, 679, 774, 754; 224/309, 321, 310; 108/48; 248/420

[56] References Cited

U.S. PATENT DOCUMENTS

| | | | |
|---|---|---|---|
| 2,479,035 | 8/1949 | Burkey | 414/462 |
| 3,326,161 | 6/1927 | Johns | 414/679 |
| 3,531,006 | 9/1970 | Farchmin | 414/462 |
| 3,696,762 | 10/1972 | Holdham | 108/48 X |
| 3,746,194 | 7/1973 | Koenig | 414/462 |
| 3,762,587 | 10/1973 | Longee, Sr. | 414/462 |
| 4,003,485 | 1/1977 | Edgerton | 414/462 |
| 4,240,571 | 12/1980 | Ernst | 224/310 |

Primary Examiner—Stephen Marcus
Assistant Examiner—Robert M. Petrik
Attorney, Agent, or Firm—Krass & Young

[57] ABSTRACT

A vehicle top carrier having guide members rigidly mounted on top of the vehicle, a load carrying frame mounted on the guide members for movement from a generally horizontal position atop the vehicle to an inclined loading and unloading position displaced from the vehicle, and a support arm assembly pivotally mounted at each end respectively to one end of the carrier frame and a vertical surface on the vehicle. The support arm assembly includes a pair of pivotally joined segments releasably secured in a rigid and generally linear relationship to each other. After the carrier frame has been slidably displaced to a partially inclined position, the support arm segments are released from their locked engagement with each other and are allowed to pivot about their adjoining ends, resulting in further inclination of the carrier frame to a more accessible loading and unloading position.

8 Claims, 6 Drawing Figures

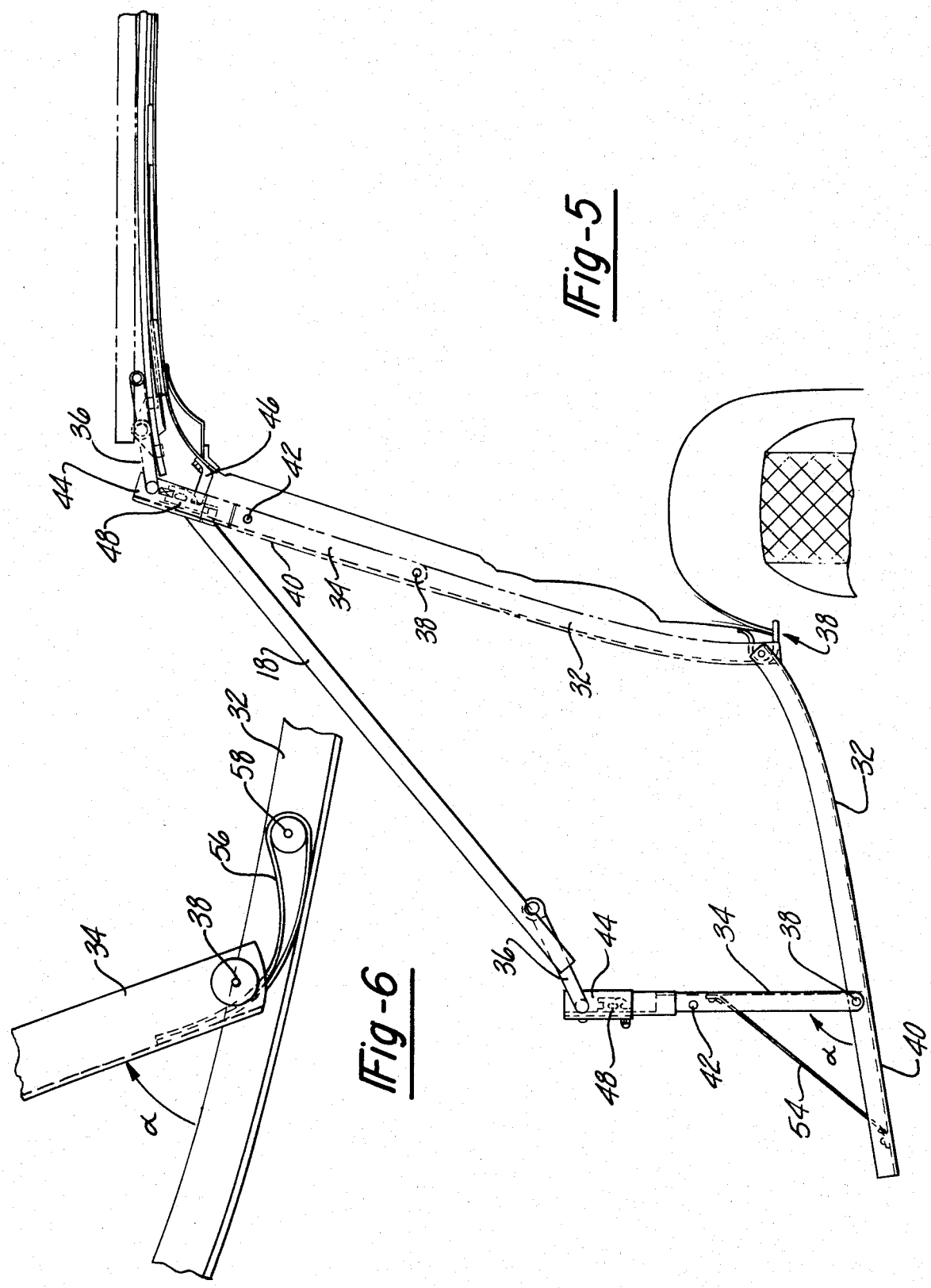

VEHICLE TOP CARRIER

TECHNICAL FIELD

This invention relates to luggage and cargo carriers which may be mounted on the tops of vehicles and more particularly to an improved carrier of the type in which a sliding or rolling frame may be displaced from the top to the side of the vehicle to facilitate loading and unloading functions.

BACKGROUND ART

Roof mounted carriers for carrying luggage or other transportable loads are widely known in the art. These devices often include structure which allows for displacement of the load carrying rack by rotation about a pivoting axis, or translation, or some combination of these motions to a more accessible loading or unloading position.

In particular, U.S. Pat. No. 4,240,571, issued to applicant, discloses a vehicle-top carrier comprising a track structure mounted on the top of a vehicle, a carrier frame slideably mounted on the track structure for displacement from a generally horizontal position on top of the vehicle to a tilted position along side the vehicle for loading and unloading the carrier. This vehicle top carrier includes a side guide track which is mounted in a generally vertical position on the vehicle below the roof track structure and a rigid, generally linear strut which is pivotally mounted at its upper end to the carrier frame and pivotally mounted at its lower end within the guide slot. After the load carrier is pulled along the track structure to a slightly inclined position alongside the vehicle, the lower end of the support strut may be slideably positioned within the guide track to a lower position in order to further lower the outside portion of the carrier frame and allow easier accessibility to the load.

While the pivot and slide mounting arrangement of the support strut permits some adjustment of the incline of the carrier rack for loading and unloading, the range of adjustment is limited by the length of the side guide track. In addition, several holes must be located and drilled in the side wall of the vehicle body in order to mount the track. Lastly, recent vehicle models, such as the "CHEVROLET BLAZER" and "FORD BRONCO" have relatively short sidewalls which do not provide sufficient room for installing the side guide track.

SUMMARY OF THE INVENTION

In accordance with one aspect of the present invention, a vehicle top carrier employs guide members mounted on the top of the vehicle, a carrier frame mounted on the guide members for displacement from a generally horizontal transport position on top of the vehicle to an inclined loading and unloading position laterally displaced from the vehicle, and a support arm pivotally mounted at its upper end to the carrier frame and pivotally mounted at the lower end to a generally vertical surface on the vehicle. In addition, means are provided for reducing the effective length of the support arm in order to move the carrier frame to a further inclined and, hence lower position.

In the preferred embodiment, a pair of guide tracks are mounted in parallel on top of the vehicle. A carrier frame is mounted for displacement on the guide tracks and may be moved from a generally horizontal position immediately over the guide tracks and on top of the vehicle to a tilted position along one side of the vehicle. The outermost side of the inclined carrier frame is supported by a relatively rigid linear support arm which extends from the carrier frame down to a mounting point on a lower portion of a vertical surface of the vehicle. The support arm is preferably of sufficient length that it extends along the side of the vehicle from the guide tracks on the roof of the vehicle to its lower pivoting mount at the bottom of the vehicle when the carrier frame is in a horizontal position. When the carrier frame is moved to its inclined position, the support arm extends at an angle from the lower mounting point on the side of the vehicle to the outermost edge of the inclined carrier frame.

The support arm assembly comprises a plurality of generally linear segments. Although two segments comprise the support arm in the preferred embodiment, it will be appreciated by those skilled in the art that a greater number of segments may be utilized to achieve the same or greater reduction in the tilt of the carrier frame. Each of these segments is pivotally joined to the adjacent segment and the two segments are releasably secured in a generally end-to-end position to form the rigid linear support arm structure. After the carrier frame is lowered to its inclined position, the adjacent segments may then be pivoted about their adjoining ends causing the support arms to assume a jacknifed position. When the support arm is in this jacknifed position, the distance between the lower mounting point of the support arm and the upper mounting point of the support arm is lessened, resulting in further inclination of the carrier frame. Detent means are preferably provided which restrict the amount of flexing or jacknifing of the segments to a desired angle. In the preferred embodiment, a strip of spring steel is mounted at each end respectively to each of the two support arm segments. The spring steel strip is folded in a relaxed position when the segments are secured in rigid alignment. However, when the segments are released and allowed to jacknife, the spring steel strip is tensioned to restrict the jacknifing to a preselected angle.

BRIEF DESCRIPTION OF THE DRAWINGS

FIG. 5 is a side view of the support arm assembly, the solid lines depicting the support arm in the jacknifed position and the dotted lines depicting the support arm in the secured position.

FIG. 6 is a side view of a section of the support arm showing alternate means for restricting the jacknifing of the support arm segments.

BEST MODE FOR CARRYING OUT THE INVENTION

Figure 1:
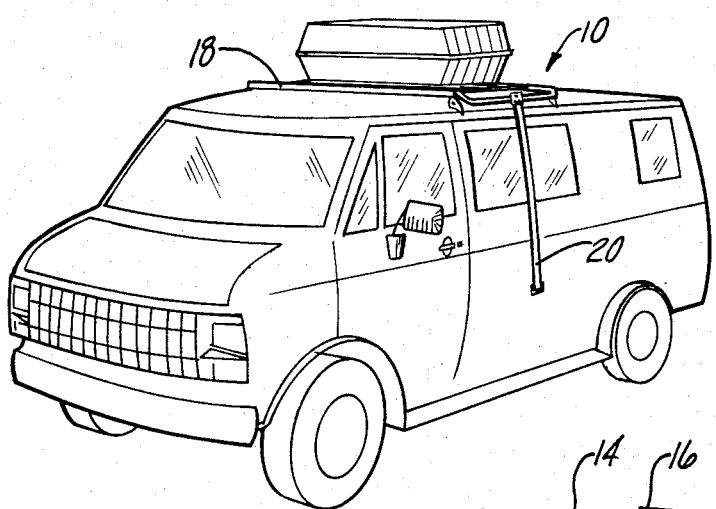
FIG. 1 is a perspective of a vehicle with a carrier structure in the transport position.
Figure 2:
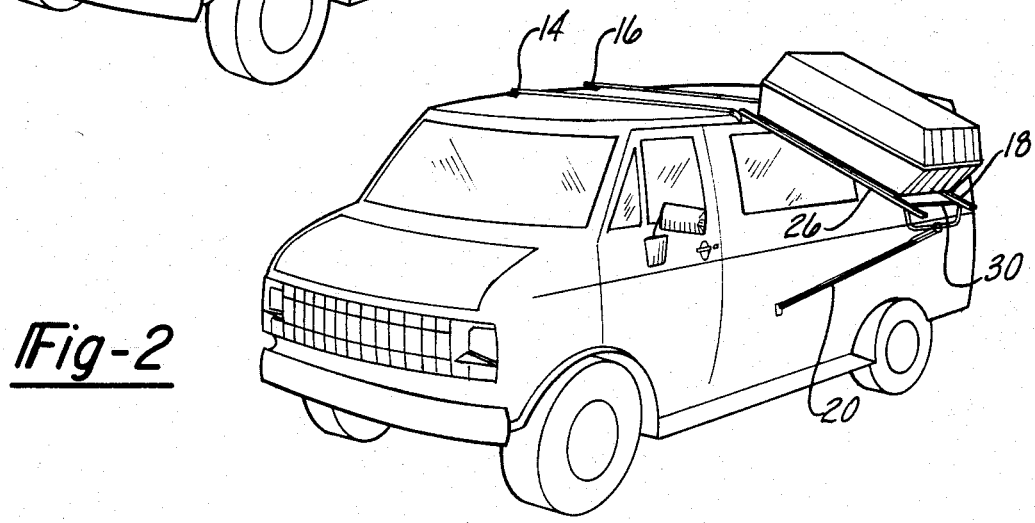
FIG. 2 is a perspective view of a vehicle top carrier with the carrier frame moved to an inclined position alongside the vehicle.
Figure 3:
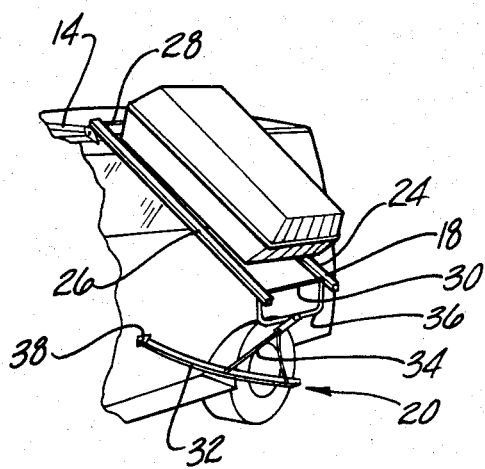
FIG. 3 is a perspective view of the vehicle top carrier support arm assembly in the jacknifed position.

Referring to FIGS. 1-3, the vehicle top carrier 10 of the present invention is shown mounted upon a suitable van type vehicle 12 in transport, partially inclined, and fully inclined positions. The vehicle top carrier 10 includes a pair of guide members 14 and 16 mounted on the top of the vehicle 12, a carrier frame 18 and a support arm assembly 20 pivotally mounted at its upper end to the carrier frame 18 and pivotally mounted at its lower end to a vertical surface on the vehicle 12.

The guide members 14 and 16 preferably comprise a pair of parallel tracks mounted by conventional fastening means to the top of the vehicle. These tracks are preferably mounted across the top of the vehicle at right angles to the longitudinal center line thereof. When mounted in this manner, the carrier frame 18 may be slideably displaced to an inclined position along one side of the vehicle. However, it should be noted that the tracks may be mounted parallel to the longitudinal axis of the vehicle 12 without departing from the spirit of the invention. When the tracks 14 and 16 are mounted in this manner, the carrier frame 18 is then moveable to its inclined position adjacent the roof and immediately to the front or rear of the vehicle 12.

The carrier frame 18 is preferably shaped as a rectangle comprising a pair of generally parallel side bars 24 and 26 and a pair of generally parallel end bars 28 and 30. The side bars 24 and 26 and end bars 28 and 30 are rigidly secured at their intersecting corners by conventional fastening means such as nuts and bolts.

A pair of casters (not shown) are preferably mounted on each of the side bars 24 and 26 of the carrier frame 18. The casters are adapted to slide lengthwise along each of the guide tracks 14 and 16, thus facilitating slideable displacement of the carrier frame 18 from its position atop the vehicle 12 to an inclined position adjacent the vehicle.

It should be noted that the casters and various other guide brackets (not shown) are mounted upon the carrier frame and allow the frame to be slideably displaced in a direction parallel to the tracks 14 and 16 but otherwise prevent the carrier frame 18 from moving or separating from the tracks 14 and 16. It should also be noted that the structure thus far described is regarded by applicant to be generally known in the art. In particular, the specific structural features of the guide members 14 and 16, the carrier frame 18 and the interconnecting components are shown in U.S. Pat. No. 4,240,571, "Car Top Carrier" issued Dec. 23, 1980 to M. Eric Ernst, the disclosure of which is incorporated herein by reference to the indicated extent.

In the preferred embodiment, the support arm assembly 20 includes a lower support arm segment 32, a upper support arm segment 34 and a cross-bar connector 36. At the upper end of the support arm assembly 20, the cross-bar connector 36 is pivotally mounted at each end respectively to side bars 24 and 26 of the carrier frame 18.

Referring to FIG. 5, the support arm assembly 20 preferably includes a lower support arm segment 32, and an upper support arm segment 34 pivotally joined at its end 38 to the lower support arm segment 32. Each of the segments 32 and 34 are perferably lightweight metal with U-shaped cross-sections. When the carrier frame 18 is in the transport position atop the vehicle 12, support arm segments 32 and 34 are maintained in a generally linear fashion along the side of the vehicle 12. It should be noted that a cross-section of the upper support arm segment 34 is slightly smaller than that of the lower support arm segment 32 so that when each of the segments is locked in a generally linear relationship relative to the other, the end portion 40 of the lower arm segment envelops substantially all of the upper arm segment 34.

A set of holes 42 are located on opposing sides of each of the lower and upper arm segments 32 and 34 near the upper end portion 40 of the lower arm segment 32. These holes are positioned in such a manner that they are in alignment when the segments are in a linear, end to end relationship to each other.

Figure 4:
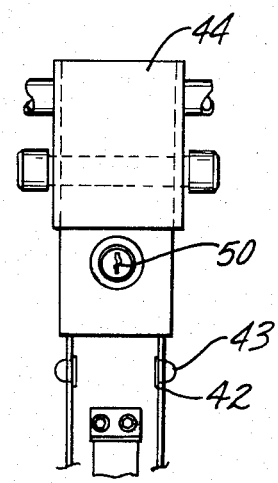
FIG. 4 is a front view of the top portion of the support arm assembly.

Releasable securing means, preferably spring buttons 43 (Shown in FIG. 4), are inserted through the holes 42 to secure the segments in this linear orientation. It should be noted that other securing means, such as an elongate steel pin, may be used without departing from the spirit of the invention.

A retainer plate housing 44 is fixedly secured at the upper end of the upper support arm segment 34. The cross-bar connector 36 is in turn connected to the retainer plate housing 44 in such a manner that the cross-bar connecter 36, retainer plate housing 44 and upper support arm segment 34 form a unitary structure. These components may be joined by conventional fasteners such as nuts and bolts, may be welded, or may be formed as a single unit as will be apparent to those skilled in the mechanical arts.

A rigid striker bar 46 is mounted on the roof of the vehicle 12 in proximity to the upper end of the support arm assembly 20. A retainer plate 48 is mounted within the retainer plate housing 44 and contacts the striker bar 46 when the carrier frame 18 is in the transport position atop the vehicle 12. Upon contact with the striker bar 46, the retainer plate 48 releaseably secures the support arm assembly 20 and, thus, the carrier frame 18 in the transport position. In the preferred embodiment, a locking mechanism 50 (shown in FIG. 4) is provided which lockingly secures the retainer plate 48 to the striker bar 46.

Upon activation of the spring buttons 43, the upper end of the upper support arm segment 34 is released from the lower support arm segment 32 and allowed to pivot about the pivot joint 38 of the two segments. The jacknifing action of the two pivoting support arm segments 32 and 34 effectively reduces the distance between the outermost end of the carrier frame 18 and the lower pivot point 52 of the support arm assembly 20, resulting in a further inclination of the carrier frame 18.

As will be appreciated by those skilled in the art, the support arm assembly 20 may be composed of a plurality of support arm segments pivotally mounted and releaseably secured in the above described fashion in order to achieve a greater range of inclination of the carrier frame 18. In addition, multiple support arm segments could be utilized in order to allow the user to release a select number of the segments from their secured positions to vary the incline of the rack as desired.

Detent means in the form of a spring steel strip 54 is mounted on each of the upper and lower support arm segments 34 and 32. The spring steel strip 54 is of sufficient flexibility that it may be folded in between the upper and lower support arm segments 34 and 32 when the segments are locked in linear position, and is of a sufficient length to allow the segments to jacknife to an angle which provides the desired tilt of the carrier frame 18. When the upper and lower support arm segments 34 and 32 are allowed to jacknife, the spring steel strip 54 reaches a static, fully extended position, restricting any further jacknifing of the segments 32 and 34 and maintaining the carrier frame in its desired unloading position.

An alternative embodiment of the detent means, shown in FIG. 6, comprises a loop of relatively inflexible spring steel 56. The spring steel 56 is looped about an anchor point 58 located on the lower support arm segment 32. The ends of the spring steel loop are then threaded between the pivot joint 38 and the wall of the upper support arm segment 34. When the upper and lower support arm segments 34 and 32 are released from their linear orientation, the spring action of the ends of the spring steel loop 56 tend to urge the segments 32 and 34 back to their co-linear position. Thus, the spring action of the spring steel loop 56 serves to limit the jacknifing action of the segments. It should be noted that the degree of resistance of the spring steel loop can be altered by utilizing steel of varying resiliency.

In operation, the vehicle top carrier may be lowered from its transport position (shown in FIG. 1) by unlocking the reatiner plate lock 50 and sliding the carrier frame 18 along guide tracks 14 and 16 until the opposite side of the carrier frame 18 reaches the end of the guide tracks 14 and 16 (shown in FIG. 2). The spring buttons 42 are then activated to allow the upper and lower support arm segments 34 and 38 to jacknife, resulting in the further lowering of the carrier frame 18 to its fully inclined unloading position (shown in FIG. 3).

Thus the vehicle top carrier of the present invention is relatively easy to install on all types of recreational vehicles and provides a simple means for accessing vehicle top loads.

Other aspects, objects and advantages of this invention can be obtained from a study of the drawings, the disclosure, and the appended claims. It should be understood that the invention has been described with reference to a preferred embodiment and that other embodiments are possible. For example, the jacknife arm segments 32 and 34 may be replaced by telescopic sections which telescope into one another to achieve the effective shortening of the support arm. It should be also noted that various detent means may be employed to control the extend to which the segments are allowed to jacknife relative to each other.

We claim:

1. A vehicle top carrier comprising:
   guide members rigidly mounted on top of the vehicle;
   a carrier frame mounted on the guide members for movement from a generally horizontal transport position atop the vehicle to an inclined position displaced from the vehicle; and
   a support arm assembly pivotally mounted at each of its terminal ends respectively to the carrier frame and to a vertical surface on the vehicle, the support arm assembly including means for shortening the effective distance between the terminal ends of the support arm, thereby to produce a further inclination of the carrier frame.

2. The vehicle top carrier described in claim 1 wherein the support arm assembly includes a plurality of segments, each segment being pivotally mounted to the adjacent segment, and each segment being releasably secured in a rigid and generally linear relationship to the adjacent segment,
   whereby, as one support arm segment is released from its locked engagement with the adjacent support arm segment, the segments pivot about their adjoining ends, resulting in a further inclination of the carrier frame.

3. The vehicle top carrier described in claim 2 wherein the support arm assembly comprises two support arm segments.

4. The vehicle top carrier of the type described in claim 2 including detent means for restricting the pivot angle of the support arm segments.

5. The vehicle top carrier of the type described in claim 4 where the detent means is a strip of spring steel attached at each of its ends respectively to each of two adjacent support arm segments.

6. The vehicle top carrier described in claim 1 including means for locking the carrier frame in a transport position.

7. A vehicle top carrier of the type described in claim 1 where the guide members are a pair of generally parallel tracks.

8. In a vehicle top carrier having guide members rigidly mounted on the top of the vehicle and a carrier frame slideably mounted on the guide members for movement from a generally horizontal transport position on top of the vehicle to an inclined loading and unloading position displaced from the top of the vehicle, the improvement comprising:
   a support arm pivotally mounted at each of the first and second ends respectively to the carrier frame and to a generally vertical surface on the vehicle, the support arm comprising a plurality of linear arm segments, each arm segment pivotally joined to the adjacent segment, and each arm segment releasably secured in a generally linear fashion to the adjacent segment.

* * * * *